United States Patent [19]

Brady et al.

[11] Patent Number: 5,328,546

[45] Date of Patent: * Jul. 12, 1994

[54] PHOTO RESIST FILM APPLICATION MECHANISM

[75] Inventors: William A. Brady, Lake Worth; See A. Chan, Coral Springs, both of Fla.; Norbert Freisitzer, Hyde Park; Rolf G. Meinert, Wappingers Falls, both of N.Y.; Prakash Nahata, Coral Springs, Fla.; Julius J. Perlini, Boynton Beach, Fla.; Mario G. M. Tavares, Pompano Beach, Fla.; Douglas A. West, Boca Raton, Fla.

[73] Assignee: International Business Machines Corp., Armonk, N.Y.

[*] Notice: The portion of the term of this patent subsequent to Apr. 21, 2009 has been disclaimed.

[21] Appl. No.: 862,701

[22] Filed: Apr. 3, 1992

[51] Int. Cl.⁵ ............................................. B32B 31/00
[52] U.S. Cl. .................................... 156/584; 156/517; 156/521; 156/542; 156/541; 156/518; 156/519
[58] Field of Search ............... 156/584, 517, 518, 519, 156/521, 540, 541, 542, 235, 238, 239, 344, 247, 249, 250, 251, 256, 261, 265

[56] References Cited

U.S. PATENT DOCUMENTS

| | | |
|---|---|---|
| 4,075,051 | 2/1978 | Brzozowski . |
| 4,273,859 | 6/1981 | Mones et al. . |
| 4,338,152 | 7/1982 | Del Bianco et al. . |
| 4,491,492 | 1/1985 | Hetherington . |
| 4,495,014 | 1/1985 | Gebrian et al. . |
| 4,714,504 | 12/1987 | Cummings et al. . |
| 4,921,566 | 5/1990 | Stork . |
| 5,106,450 | 4/1992 | Freisitzer ............................ 156/517 |

Primary Examiner—David A. Simmons
Assistant Examiner—Charles Rainwater
Attorney, Agent, or Firm—Richard A. Tomlin

[57] ABSTRACT

A dry film photoresist laminator includes a punch and die assembly 24 which punches a rolled sheet dry film photoresist material 14, that is comprised of a dry film photoresist material 18 sandwiched between a Mylar top layer 16 and a polyolefin bottom layer 20, into photoresist decals. The photoresist decals are bonded to a tacky transport tape 40 which carries the decals to a polyolefin peeler assembly 54 that rolls a high tack tape 57 along the polyolefin layer 20 of the decal, thereby peeling it from the decal. The decal is advanced by a laminating assembly 44 which rolls the decal onto a heated wafer 72, thereby bonding the exposed photoresist material 18 to the wafer 72. Bonded wafer 72 and decal 14 are removed from the transport tape 40. A tape transport assembly 44 carrying the transport tape and decal is advanced through the various process steps.

2 Claims, 7 Drawing Sheets

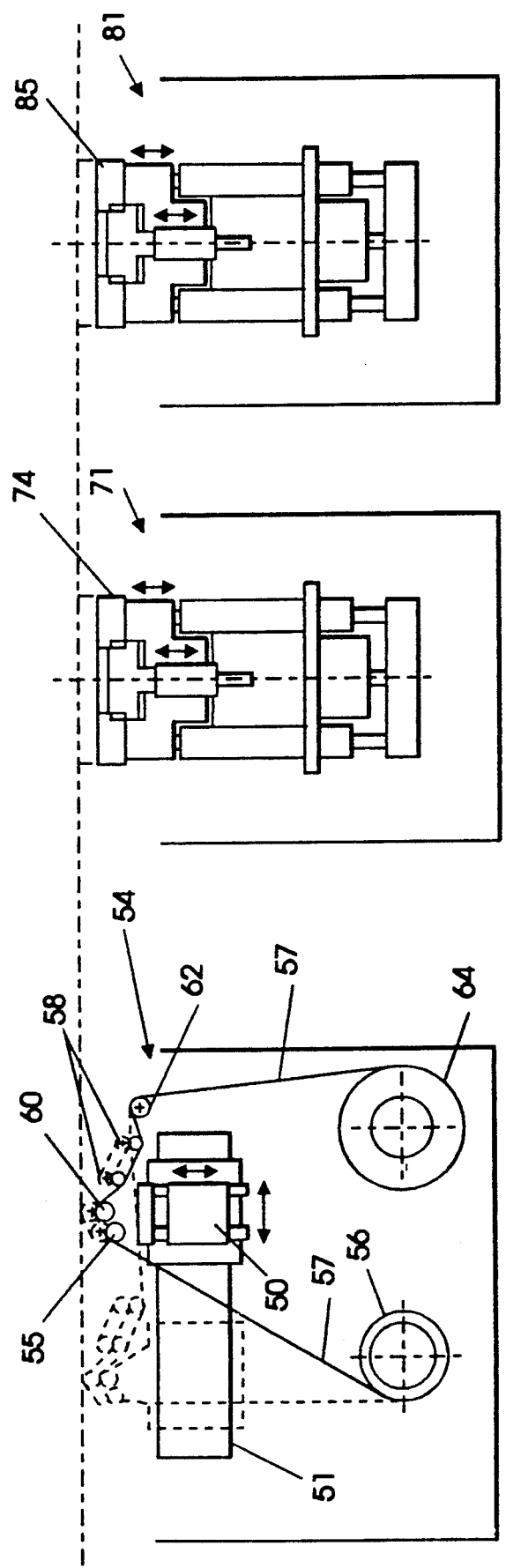

PHOTO RESIST FILM APPLICATION MECHANISM

TECHNICAL FIELD

This invention relates to semiconductor manufacturing tools, and more particularly, to an apparatus for the application of dry film resist to a semiconductor wafer.

BACKGROUND ART

Photoresist dry films have been developed for use in lithographic processes in the manufacture of integrated circuits. Use of dry film photoresist has become particularly critical in the manufacture of large scale integrated (LSI) and very large scale integrated (VLSI) devices. Commercially available forms of this film are manufactured by companies such as the Dynachem and Dupont Corporations, and are characterized as being easily contaminated, tacky and limp. Although tacky, these films are "peelable", making it possible to package them with protective cover films such as Mylar TM, polyethylene, or polyolefin to insure the integrity of the photoresist film during handling. Mylar is a trademark of the E. I. Dupont de Nemours Co.. The photoresist manufactured by Dynachem, for instance, is packaged between polyethylene layers and rolled into spools. The photoresist manufactured by Dupont, alternatively, is packaged in multi-layer rolls wherein the photoresist is sandwiched between a Mylar top layer and a polyolefin bottom layer.

For use in lithographic processes, the dry film resist must be uniformly laminated to the substrate under manufacture. This is typically done with a lamination process, but in order to utilize the previously described rolled dry film resist products, the resist material must both be separated from the protective layer(s) and laminated to the substrate. The lamination process is further complicated by the fact that semiconductor wafers are circular in shape whereas the resist is rolled out as a continuous sheet which is rectangular in shape.

A prior technique utilized to apply photoresist to substrates is described in U.S. Pat. No. 4,495,014 (Gebrian, et al.). The Gebrian, et al. reference discloses a process of laminating under pressure a section of supported photoresist material to a moving sheet substrate, releasing the lamination pressure, removing the support from the laminated layer and thereafter trimming the photoresist layer to conform to the profile of the sheet substrate.

The process disclosed in the Gebrian, et al. reference is unacceptable for semiconductor wafers because the trimming process is restricted to trimming the photoresist material to the outside profile of rectangular substrates. In semiconductor wafer processing, a non-exclusion area (typically 3 millimeters) within the outside diameter of the wafer is required for handling of the wafer. This means that the resist material must be trimmed in a circular pattern within the outside diameter of the wafer.

The prior technique for placing dry film resist on circular wafers was to laminate the resist to the wafer, and then trim the resist into a circular pattern inside the outer diameter of the wafer. The trimming process included either trimming with a laser or a sharp edge, such as a knife. Laser cutting is unacceptable because the heat produced from the process tends to bond the plastic protective layer to the wafer. Likewise, knife cutting processes are unacceptable because they cause a great deal of structural damage to the wafer and the resultant patterns may not be dimensionally accurate.

An apparatus which substantially automatically and relatively accurately laminates circular dry film resist patterns to semiconductor wafers, is therefore highly desirable.

An improved resist transport and lamination system is taught in commonly assigned copending Application, Ser. No. 07/630,668, filed Dec. 20, 1990 now U.S. Pat. No. 5,106,450, entitled "Dry Film Resist Transport and Lamination System For Semiconductor Wafers", the entire disclosure of which is hereby incorporated by reference herein, which utilizes a transport tape and a circular punch as part of the lamination process to provide substantially accurately positioned film photoresist materials on a circular wafer. This invention is an improvement over the invention disclosed therein.

DISCLOSURE OF THE INVENTION

An object of the present invention is to provide an apparatus which laminates trimmed dry film resist material onto semiconductor wafers with an improved degree of uniformity and accuracy.

According to the present invention, rolled dry film resist material which is sandwiched between two protective layers is unrolled and punched into circular patterns that are deposited onto a transport tape. The protective covering is then removed from the side of the resist pattern not attached to the transport tape by a peeling roller assembly. The resist pattern is then laminated onto a semiconductor substrate.

The present concept minimizes movement of the transport tape relative to the laminating equipment and minimizes the length of the transport tape used in the process. The effect of any variation in the "stretchability" of the transport tape on the accurate positioning of the dry filter photoresist relative to the semiconductor wafer is accordingly minimized. This is accomplished by keeping the length of the transport web as short as possible and moving the web transporting device, in which the transport web is fixed, through the various processing stations rather than requiring the transport web to be sufficiently long to reach across the combined length of the processing stations. Any web tracking variation in the latter arrangement could result in diminished accuracy of alignment between the wafer and the photoresist material. The improvement is obtained in the present invention by utilizing an apparatus wherein the transport web is fixed in the transport device during the complete laminating cycle. Movement of the transport device is carefully controlled.

The present invention allows for the lamination of semiconductor substrates under relatively total computer control. The dry film resist is applied relatively bubble-free in a substantially uniform manner. In addition, the resist material is cut and placed on the wafers with an improved degree of accuracy and relatively free of voids.

These and other objects, features and advantages of the present invention will become more apparent in light of the detailed description of the exemplary embodiments thereof as illustrated by the drawing. Similar parts are given similar designations in the various figures.

BRIEF DESCRIPTION OF THE DRAWING

FIGS. 1A-B is a side view of the lamination apparatus of the present invention.

BEST MODE FOR CARRYING OUT THE INVENTION

Figure 1A:
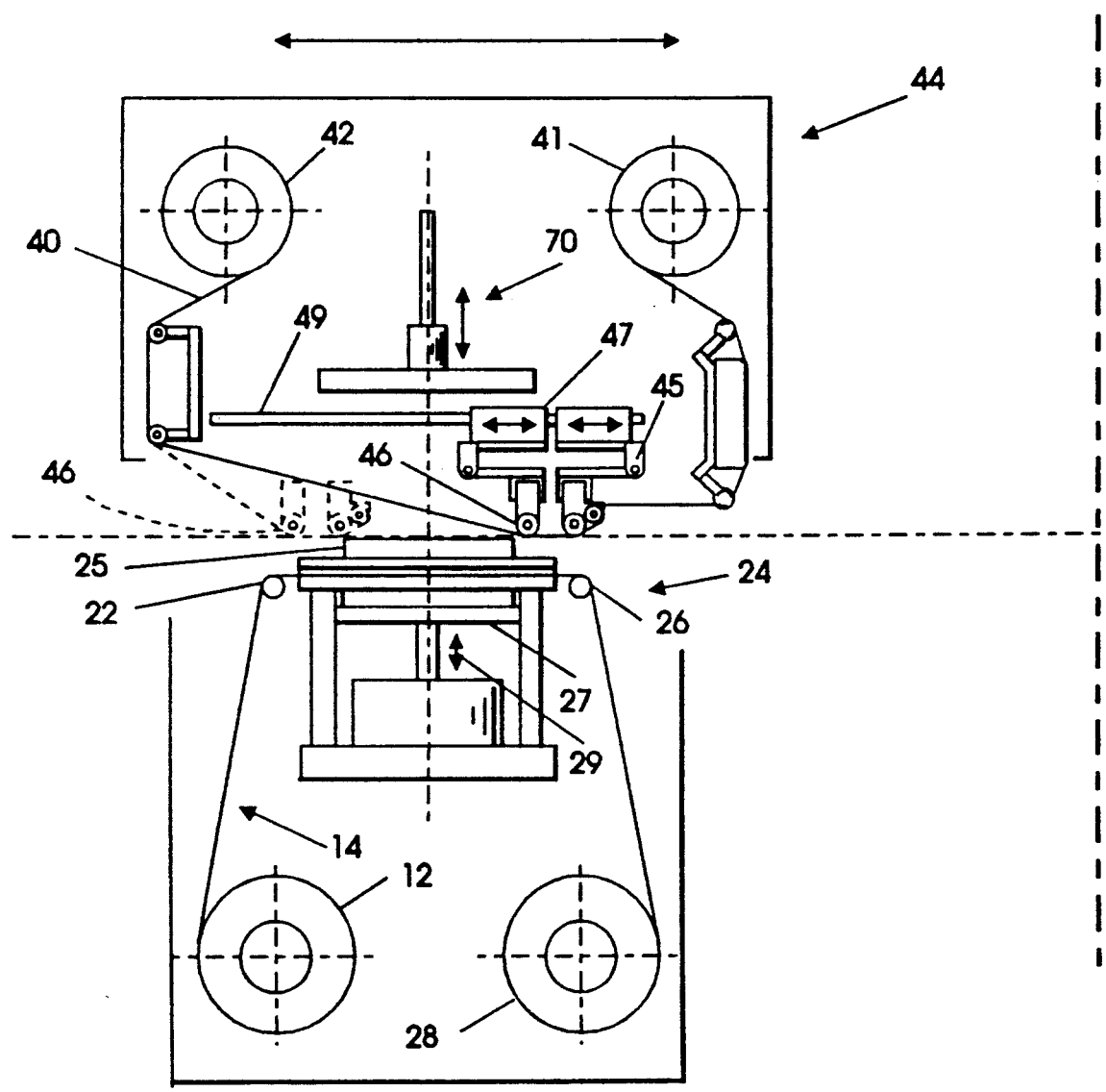

Referring now to FIGS. 1A-B, 2, and 3 the dry film resist laminator of the present invention includes a spool 12 of dry film resist laminate material generally designated 14. The preferred dry film resist material in the present embodiment is Riston. Riston is a trademark of E. I. DuPont deNemours Co. and is comprised of a photosensitive dry film resist 18 disposed between a top protective layer of Mylar 16 and a bottom carrier layer of polyolefin 20. Although Riston is used in the preferred embodiment, any dry film resist material which is adhered onto a protective layer and rolled into spools can be utilized.

The Riston tape 14 is comprised of a top protective layer of Mylar plastic film 16, a layer of dry film resist material 18 and a bottom layer of polyolefin 20.

Figure 3:
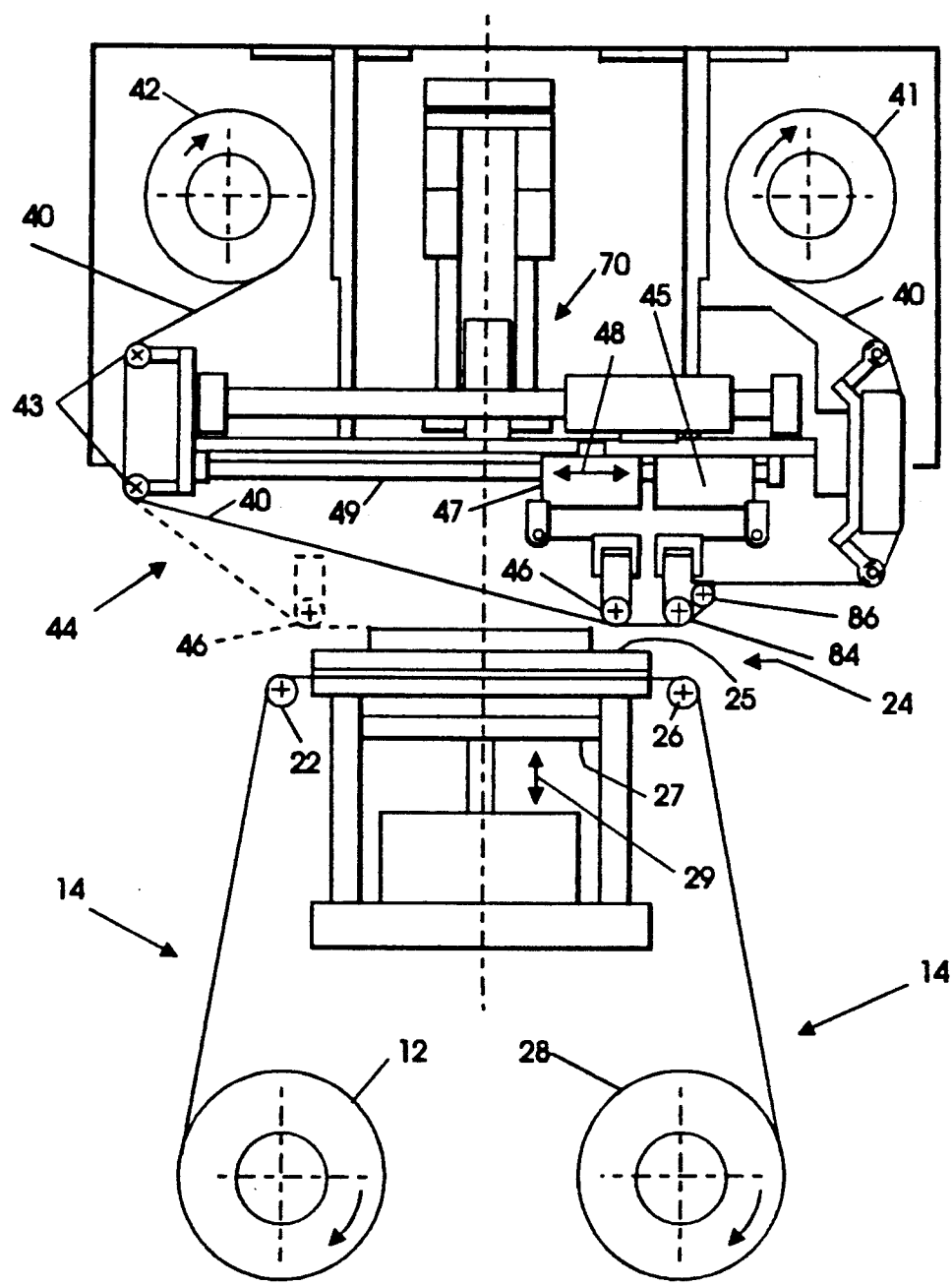
FIG. 3 is an enlarged side view of the transport tape application and circular decal punch apparatus of this invention.

Referring now to FIGS. 1A-B and 3, the Riston 14 from spool 12 is guided around a roller 22, over a punch press assembly generally designated 24, around another roller 26 and is eventually collected by drive take up spool 28 after the entire laminating and separating process is complete.

Take up spool 28 and transport tape spool 41 are driven by AC motors (not shown) that advance Riston film 14 and transport tape 40 in position over punch assembly 24.

After resist tape 14 is advanced by take up spool 28, a punch assembly 24 is moved vertically upward in a direction as shown by arrow 29 forcing the dry film resist laminate 14 through a circular die 25, thereby punching out a circular "decal" of tape 14. It is required that Riston laminate 14 be clamped in the punch assembly 24 during the punching process. The preferred method of clamping Riston is by making the top inner surface of the punch assembly 24 be configured as a vacuum chuck in order to hold the resist material flat against this surface. Vacuum chucks are well known in the prior art and are typically utilized in the semiconductor art for clamping silicon wafers.

A tape transport assembly, generally designated 44 is then brought horizontally over the punch assembly 24, bringing a gimbaled laminating roller 46 within close proximity of the leading edge of the resist decal 14. The transport tape 40 is provided by a spool 42 and is utilized to carry resist decals 14 through the laminating and stripping processes of the present invention. The transport tape 40 may preferably be a sticky, low stress and low tack tape, such as part number 336 manufactured by 3M. The transport tape 40 comes off of spool 42, around rollers 43, and passes above the punch assembly 24 above the die 25, punch 27 and resist decal. A slight angular separation of about 15 degrees is maintained between the roller 46 contact point and the rest of resist decal 14 in order to prevent premature contact of transport tape 40 to resist decal 14.

The laminating roller 46 is then rolled toward the trailing edge of decal 14, thereby uniformly laminating the resist decal 14 to transport tape 40. Laminating roller 46 is suspended from pneumatically driven, magnetically coupled platform 47. Platform 47 is mounted for slideable motion in the direction shown by arrow 48 on guide bar 49. A similar guide bar is mounted directly behind (as seen in the Figures) and parallel to guide bar 49 to provide slidable support for platform 47. The gimbaled laminating roller 46 is adjustably spring loaded to provide the roller's operational pressure and mechanical compliance. A lamination roller speed of about 50 mm per second is adequate to provide a relatively bubble free, uniform bond of decal 14 to transport tape 40.

Figure 2A:
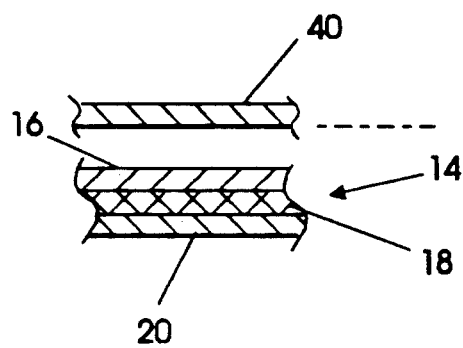
FIGS. 2 A-E are cross-sectional views representing the laminate structure as it appears through the various process steps of the present invention.
Figure 2B:
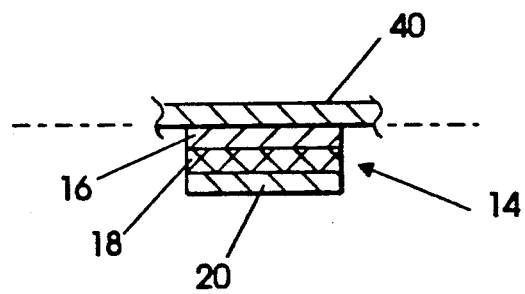
Figure 4:
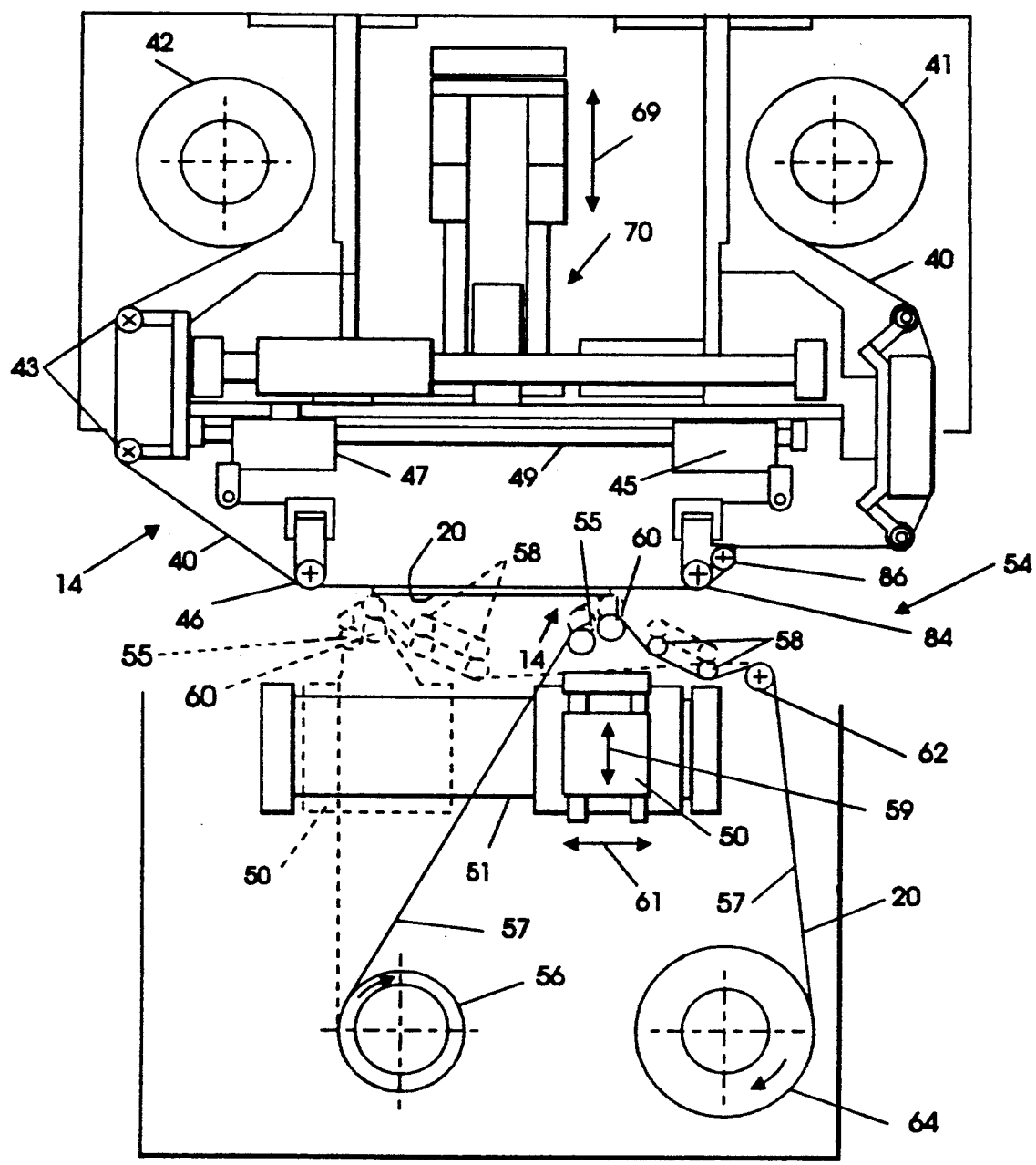
FIG. 4 is an enlarged side view of the transport tape application and the polyolefin peeling assembly of the present invention.

Vacuum on the punch assembly 24 top inner surface is then released and a slight positive pressure is provided to separate resist decal 14 from the punch. As shown in FIG. 2B, after separation, resist decal 14 is now suspended by its Mylar layer 16 to the transport tape 40. The punch 27 is then lowered to allow clearance for movement of the transport tape assembly 44 to the polyolefin peeling assembly, generally designated 54 as shown in FIG. 4. Referring now to FIGS. 1A-B, 2 and 4, transport tape assembly 44 is indexed to a position over polyolefin peeler assembly 54 by, preferably, using a servo system such as an Anorad Linear Drive (not shown).

Resist decal 14 bonded to transport tape 40, as shown in FIG. 2B is advanced along with tape transport assembly 44 and positioned over polyolefin peeler assembly 54 by the linear drive (not shown). The purpose of assembly 54 is to remove bottom polyolefin layer 20. A 1" wide, high-tack tape 57, such as part number 800 manufactured by 3M is reeled off of a supply spool 56 and is guided around a guide roller 55. Peeler assembly 54 is raised in the direction shown by arrow 59 into position relative to transport assembly 44 by pneumatic driven elevator 50, supported on slider platform 51. Take up spool 64 is driven by an AC motor (not shown), to advance peeling tape 57 after peeling has been completed.

Figure 2C:
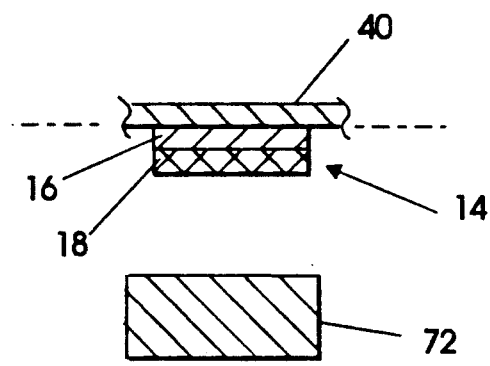

Pressure plate and chuck assembly generally designated 70 is used to move transport tape 40 and decal 14 downward in the direction shown by arrow 69 to cause pressure roller 60 to create contact between peeling tape 57 and the polyolefin layer 20 at the leading edge of the resist decal 14. The separating rollers 58 and the pressure roller 60 and guide roller 55 are then moved linearly along guide bar slider platform 51 in the direction shown by arrow 61 in contact with the bottom of resist decal 14 towards the trailing edge of decal 14, thereby causing the peeling tape 57 to bond to the bottom polyolefin layer 20, thus striping layer 20 away from resist decal 14, resulting in the structure as shown in FIG. 2C. The polyolefin layer 20 of resist decal 14 is subsequently moved along the peeler track and wound onto peeler take up spool 64. A force applied on pressure roller 60 of about 50 grams by pressure chuck assembly 70, is adequate to remove the polyolefin layer 20 from resist decal 14, Riston layer 18. The pressure chuck assembly 70 is used to support the transport tape 40 while the peeling assembly 54 peels polyolefin layer 20.

Figure 5:
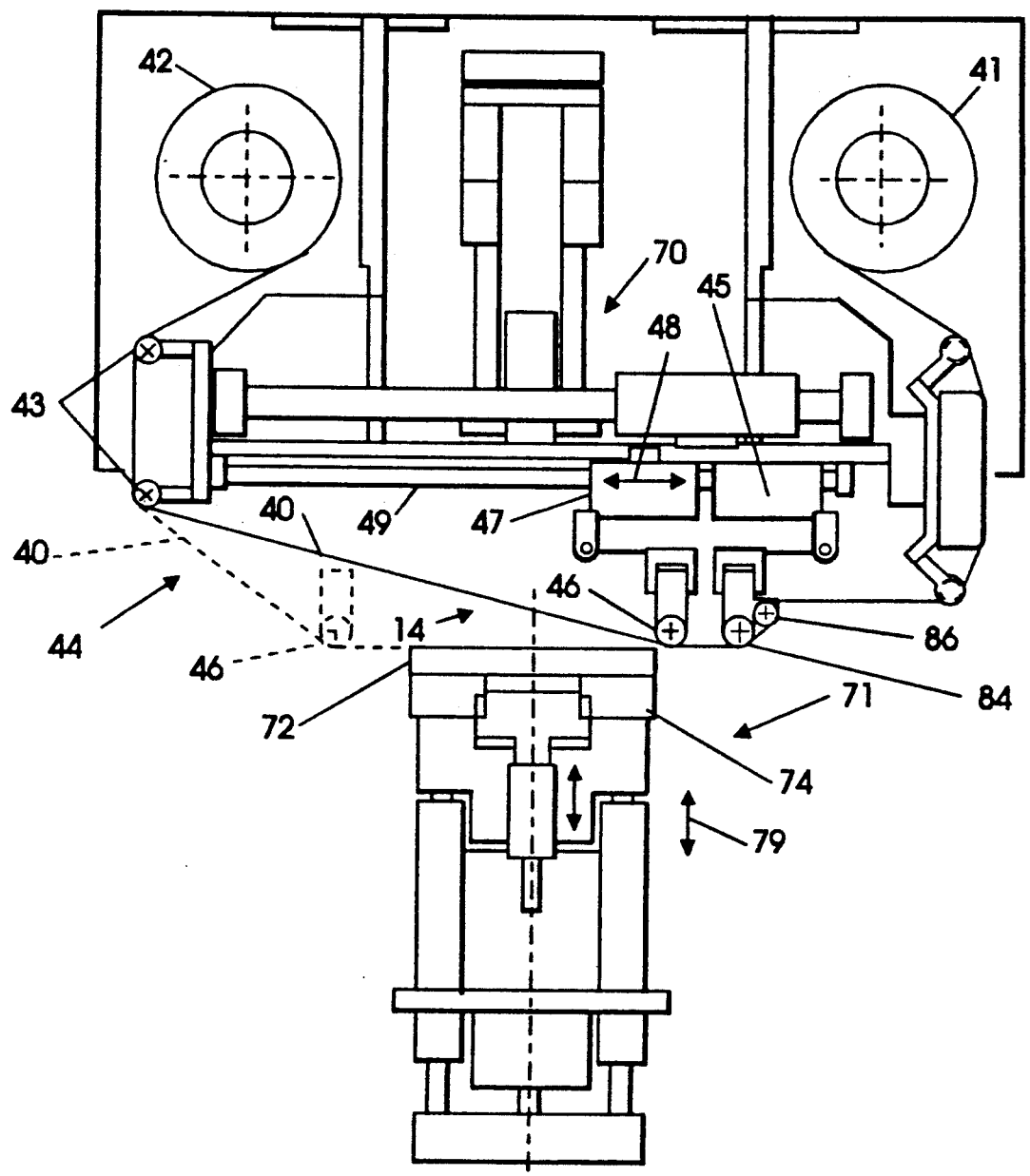
FIG. 5 is an enlarged side view of the laminator assembly in accordance with the present invention.
Figure 6:
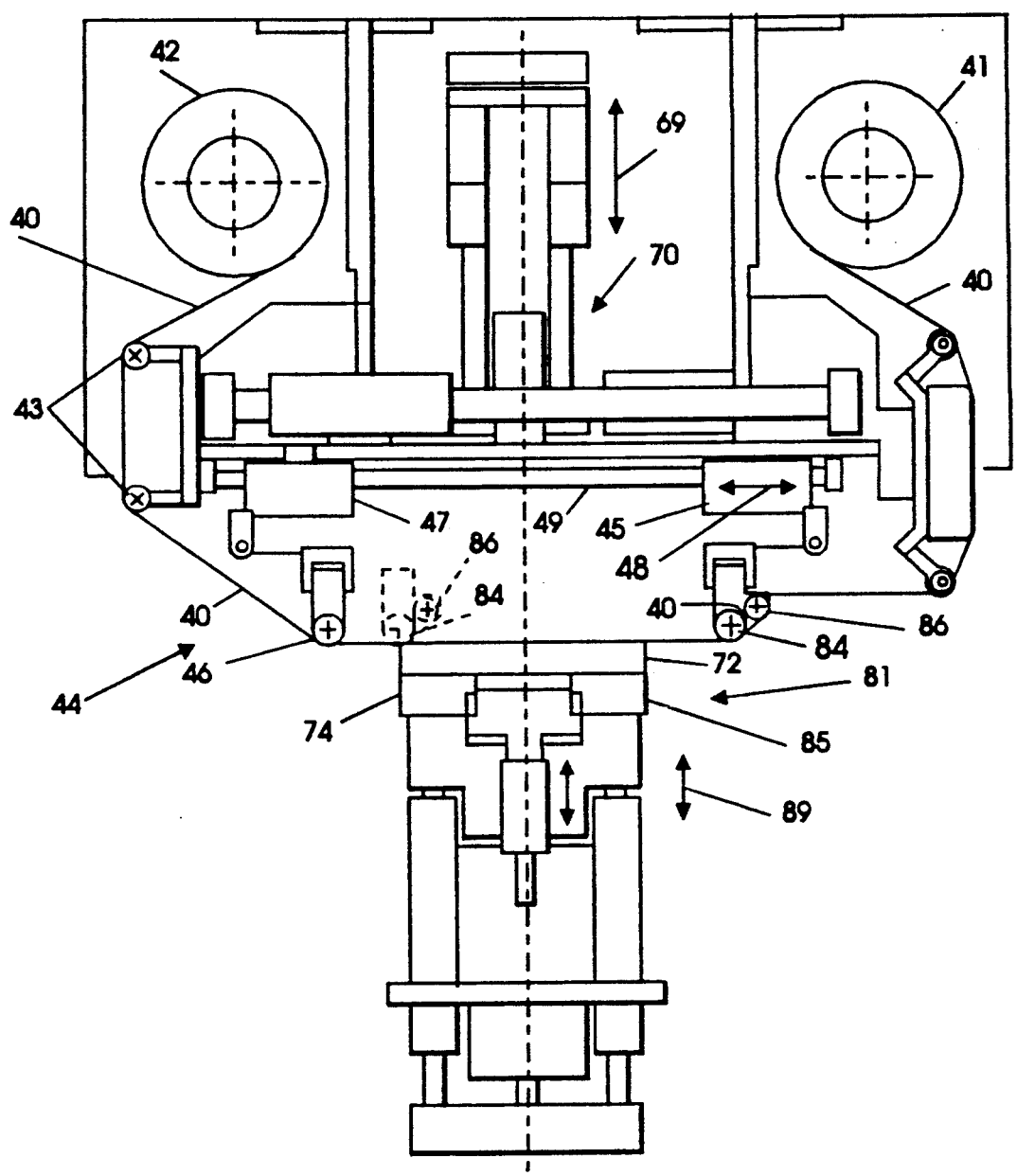
FIG. 6 is an enlarged side view of the separator assembly in accordance with the present invention.

Referring now to FIGS. 1A-B, 2 and 5 after polyolefin layer 20 is peeled off resist decal 14, the tape transport assembly 44 is again advanced by a linear drive motor (not shown) to move transport tape 40 (and the polyolefin-less resist decal 14 as shown in FIG. 2C) to a laminating assembly generally designated 71. Laminating roller 46 is returned to the position shown in solid line in FIG. 5. Transport tape 40 is tensioned through the entire laminating and stripping processes by an AC motor (not shown) applying torque to spool 42. A semiconductor wafer 72 is placed on a heated vacuum chuck assembly 74 and raised vertically in the direction shown by arrow 79 to a lamination position. Lamination roller 46 positioned above transport tape 40 is rolled linearly back, forcing resist decal 14 into contact with the leading edge of wafer 72. A slight angular separation of about 15 degrees between wafer 72 and resist 14 decal supported on transport tape 40 prevents premature contact between the decal and the wafer. The lamination roller 46 is rolled linearly back toward the trailing edge of wafer 72 (or "left") in the direction shown by arrow 48 as shown in FIG. 5 to the position indicated by dashed lines. Pressure from the roller 46 laminates the resist decal 14 onto wafer 72 surface as shown in FIG. 2D. A lamination roller force of about 1-5 pounds and a rolling speed of about 50 mm per second is adequate to bond resist decal 14 to wafer 72 relatively uniformly and relatively free of bubbles. Also, heating wafer 72 to about 85 degrees Celsius by utilizing a heated vacuum chuck promotes better bonding of decal 14 to wafer 72.

Figure 2D:
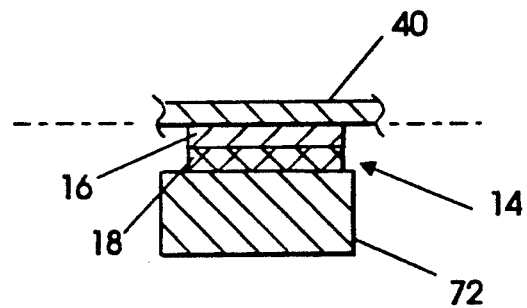
Figure 2E:
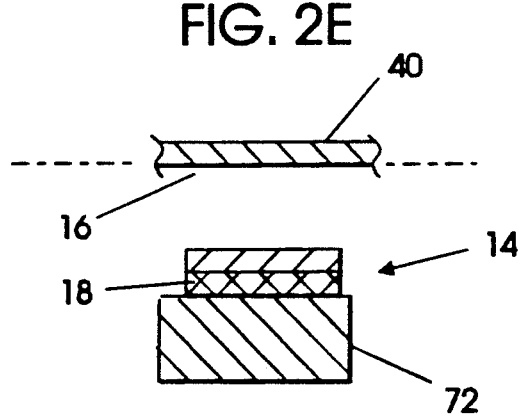

After resist decal 14 is laminated to wafer 72, the pressure from the vacuum chuck 74 is released and the chuck is lowered, leaving the wafer 72 suspended by the transport tape 40 as shown in FIG. 2D. Referring now to FIGS. 1A-B, 2 and 6, tape transport assembly 44 is now used to remove transport tape 40 from Riston tape lamination decal 14.

Assembly 44 includes a separating roller 86 and a pressure roller 84, arranged so as to create an approximately 90 degree bend in transport tape 40 as it is threaded under the pressure roller 84 and over the separating roller 86. The rollers 84, 86 are gimbaled and attached to a platform 45 identical to platform 47 and driven similarly. Assembly 44 is moved into position over assembly 81. Heated vacuum chuck 85 is raised into separating relationship with assembly 44 in the direction shown by arrow 89.

Platform 45 is then moved linearly back towards the trailing edge of the wafer 72 (or "left") in the directions shown by arrow 48 in the figures. Separating roller 86 and pressure roller 84 apply a vertical peeling force to transport tape 40 as platform 45 is moved, removing the transport tape 40 from Mylar layer 16 leaving the structure shown in FIG. 2E, leaving the Mylar layer 16 bonded to the resist covered wafer 72. To ensure that Mylar layer 16 is not removed from a resist layer 14, a low tack transport tape 40, should be utilized and the temperature of the vacuum chuck 85 should be raised to about 45 degrees Celsius.

All tape and web spools are driven by AC motors. Tension is maintained on tape 40 and the peeling tapes by application of torque by the AC synchronous motors. Although specific components and elements have been set out above in the description of the preferred embodiment, other components, elements and modifications may be made without departing from the spirit and scope of the present invention, as defined in the appended claims.

What is claimed is:

1. An automatic laminator for laminating onto semiconductor wafers a photoresist laminating material, the laminating material being packaged in sheets between a protective bottom and top sheet, the automatic laminator comprising:

a transport tape transport assembly for moving a transport tape into registration with;

a) a punching assembly for punching a decal of laminating material and for transferring the material to the transport tape, b) a peeler assembly for removing a protective layer from the lamination material, c) a laminating assembly for laminating a wafer to the lamination material, wherein the transport tape is fixed in the transport tape transport assembly during the complete lamination cycle, and d) a separating assembly for removing the laminated wafer from the transport tape.

2. The automatic laminator of claim 1 wherein the transport tape transport assembly also includes stripping means for removing the transport tape from the remaining protective layer.

* * * * *